May 7, 1935.   E. H. BLUNT   2,000,009
FEED WATER HEATER FOR LOCOMOTIVES, ETC
Original Filed Oct. 27, 1923   11 Sheets—Sheet 1

Inventor
Edmund H Blunt,
By Attorney

Inventor
Edmund H Blunt,
By
Attorney

May 7, 1935. E. H. BLUNT 2,000,009
FEED WATER HEATER FOR LOCOMOTIVES, ETC
Original Filed Oct. 27, 1923 11 Sheets-Sheet 3
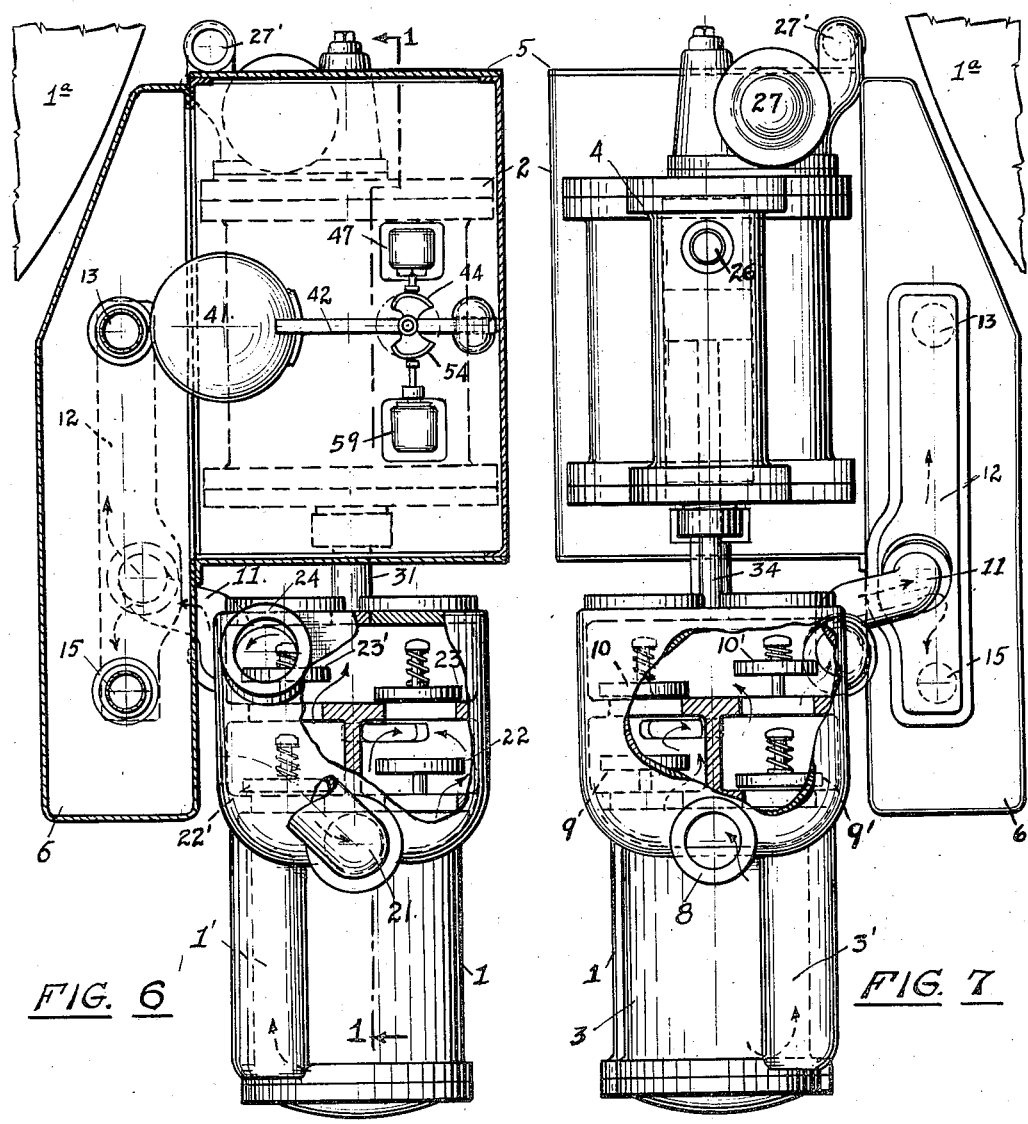
FIG. 6
FIG. 7
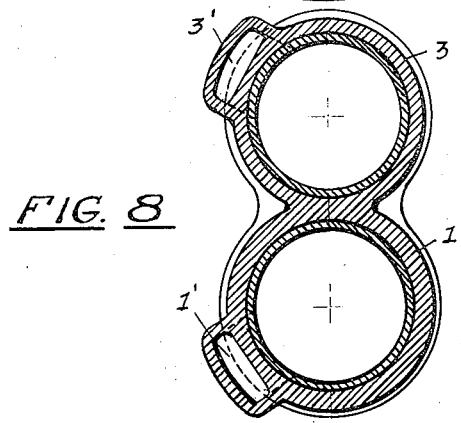
FIG. 8
Inventor
Edmund H. Blunt,
By Attorney May 7, 1935. E. H. BLUNT 2,000,009
FEED WATER HEATER FOR LOCOMOTIVES, ETC
Original Filed Oct. 27, 1923 11 Sheets-Sheet 4
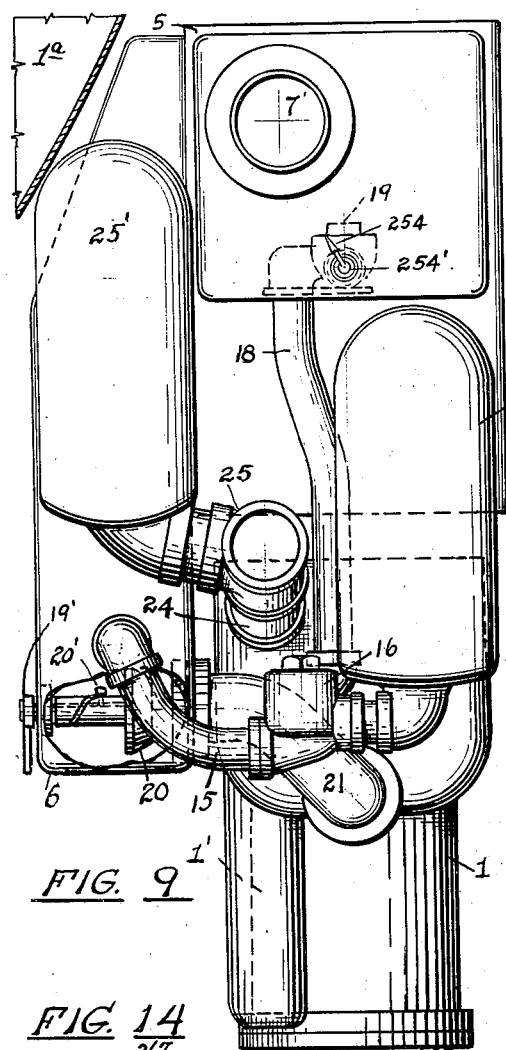
FIG. 9
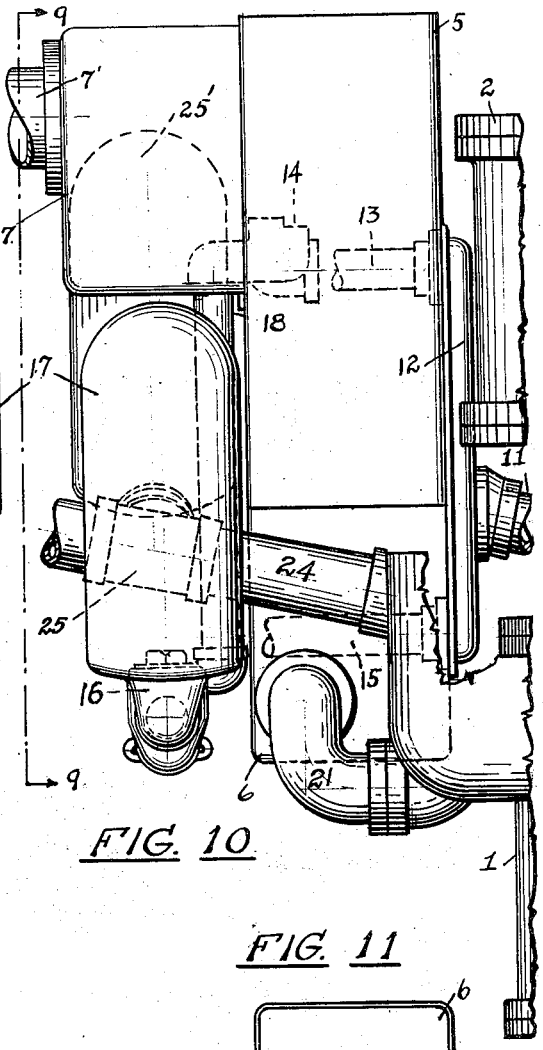
FIG. 10
FIG. 11
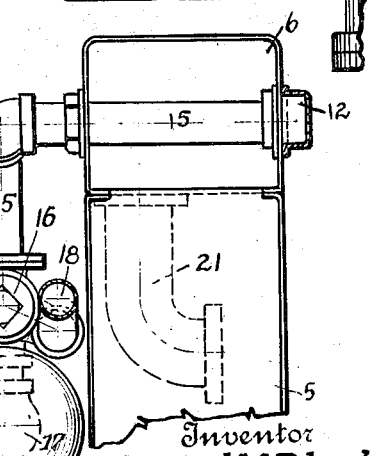
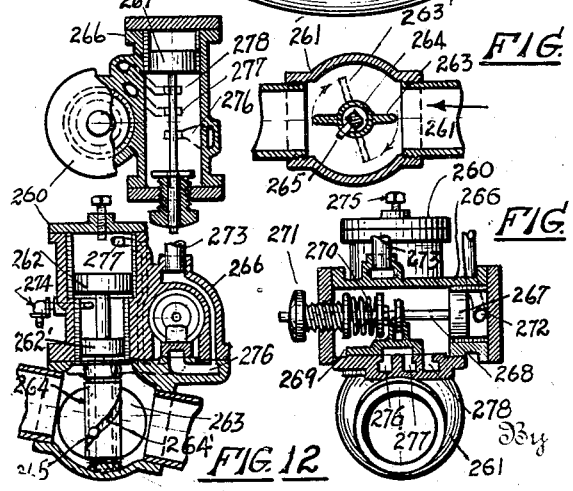
Inventor
Edmund H. Blunt,

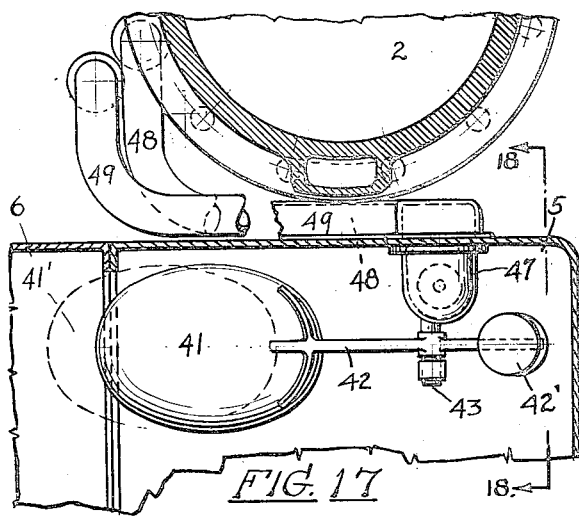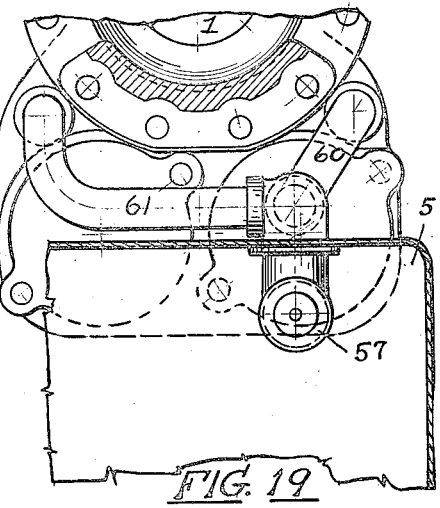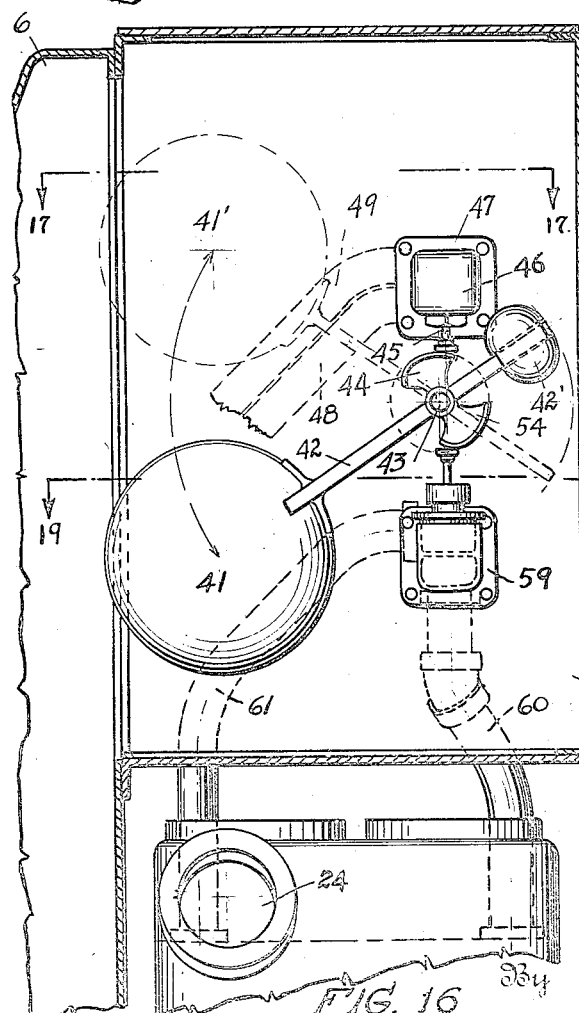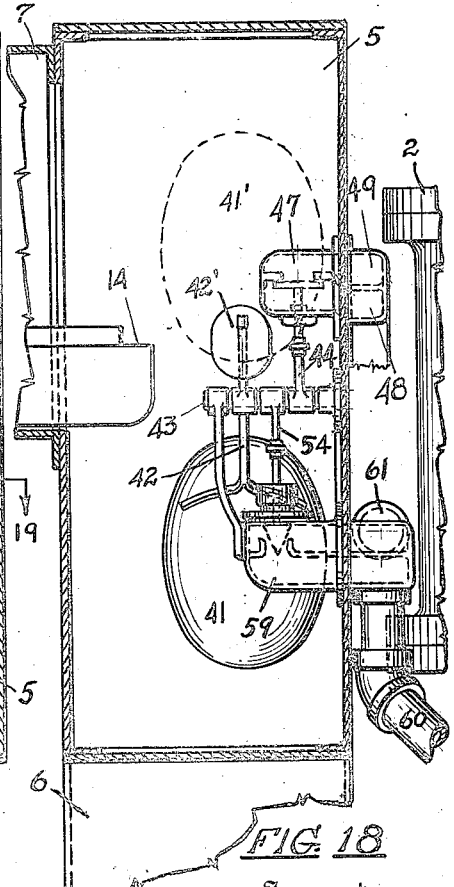

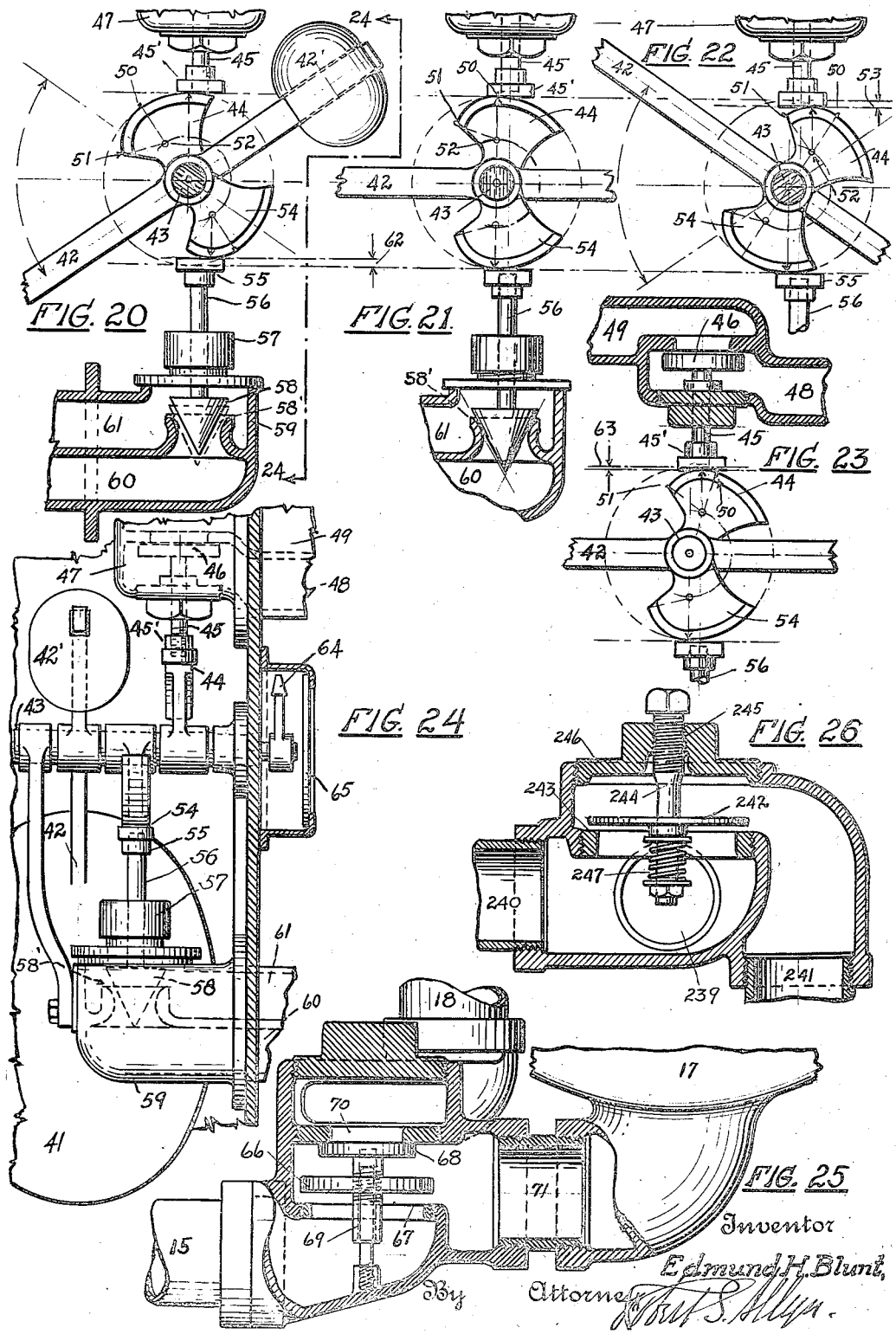

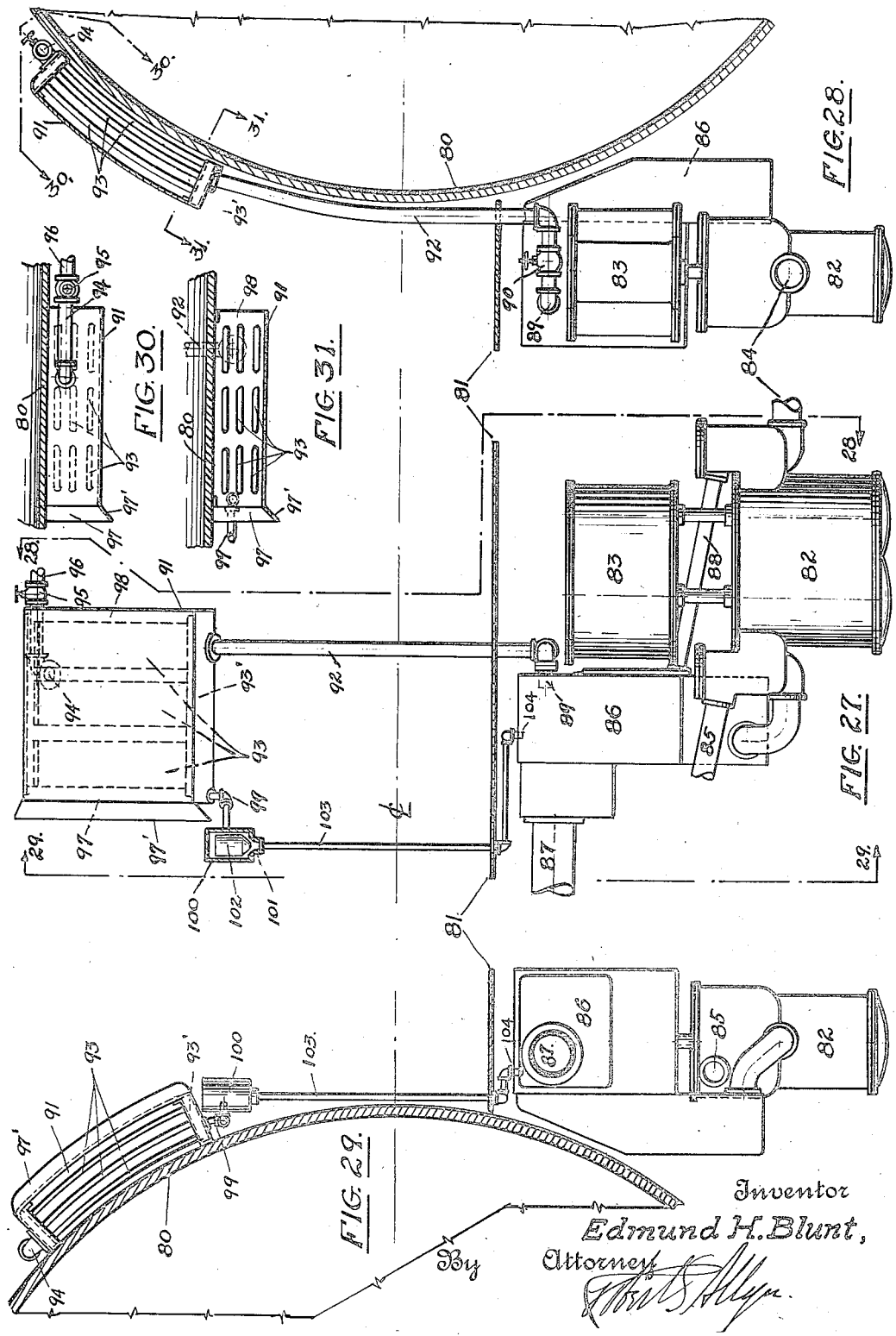

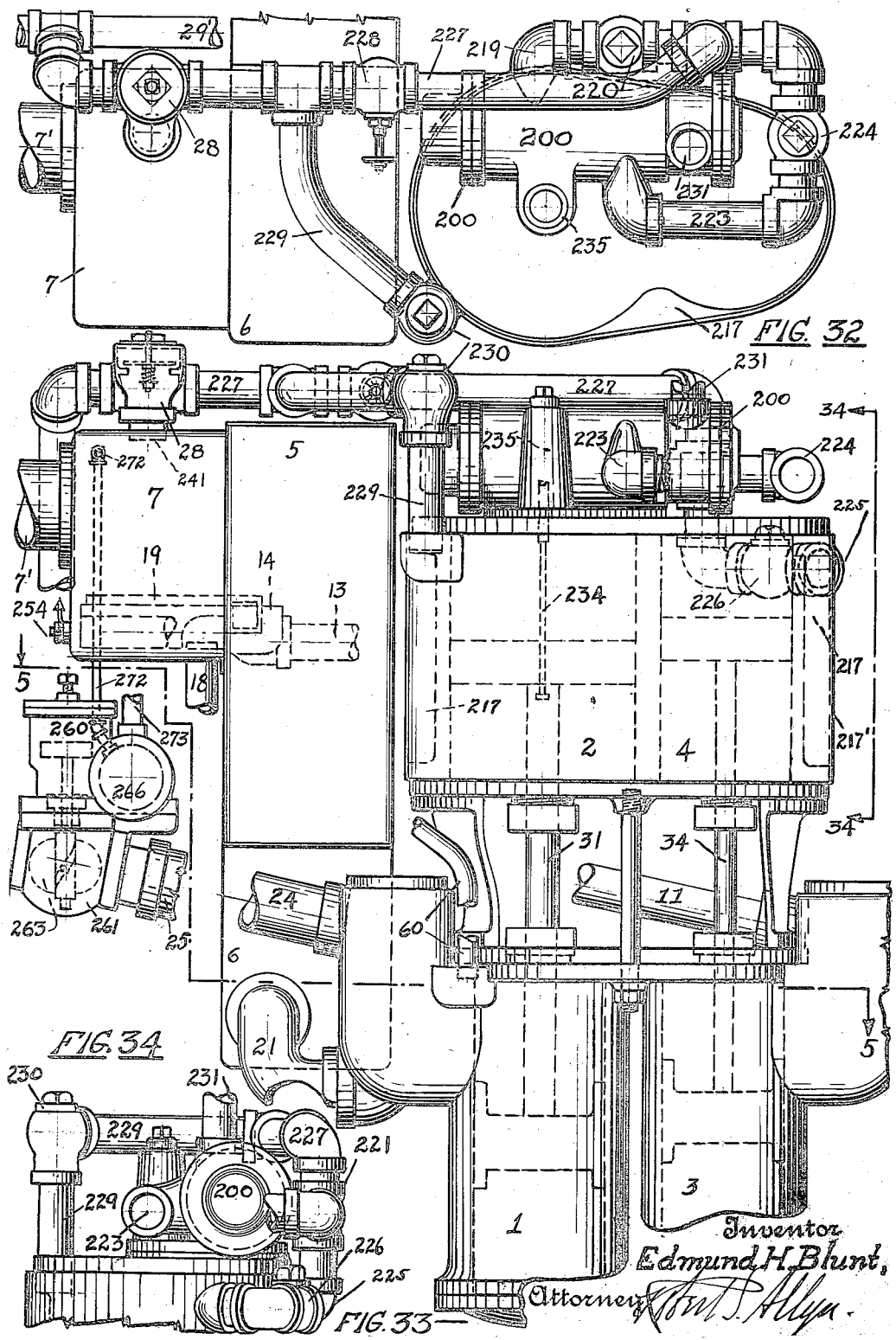

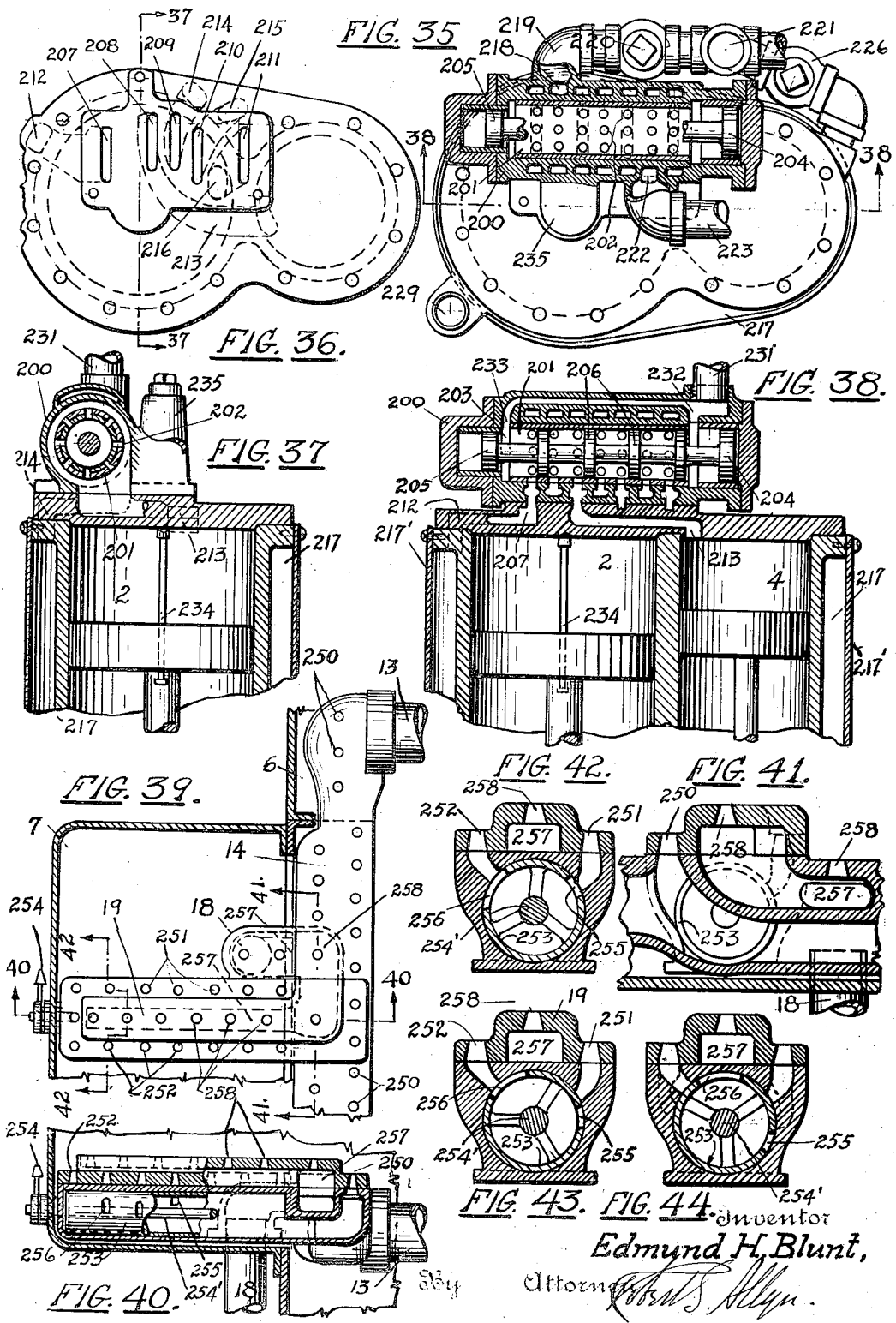

May 7, 1935.  E. H. BLUNT  2,000,009
FEED WATER HEATER FOR LOCOMOTIVES, ETC
Original Filed Oct. 27, 1923  11 Sheets-Sheet 10
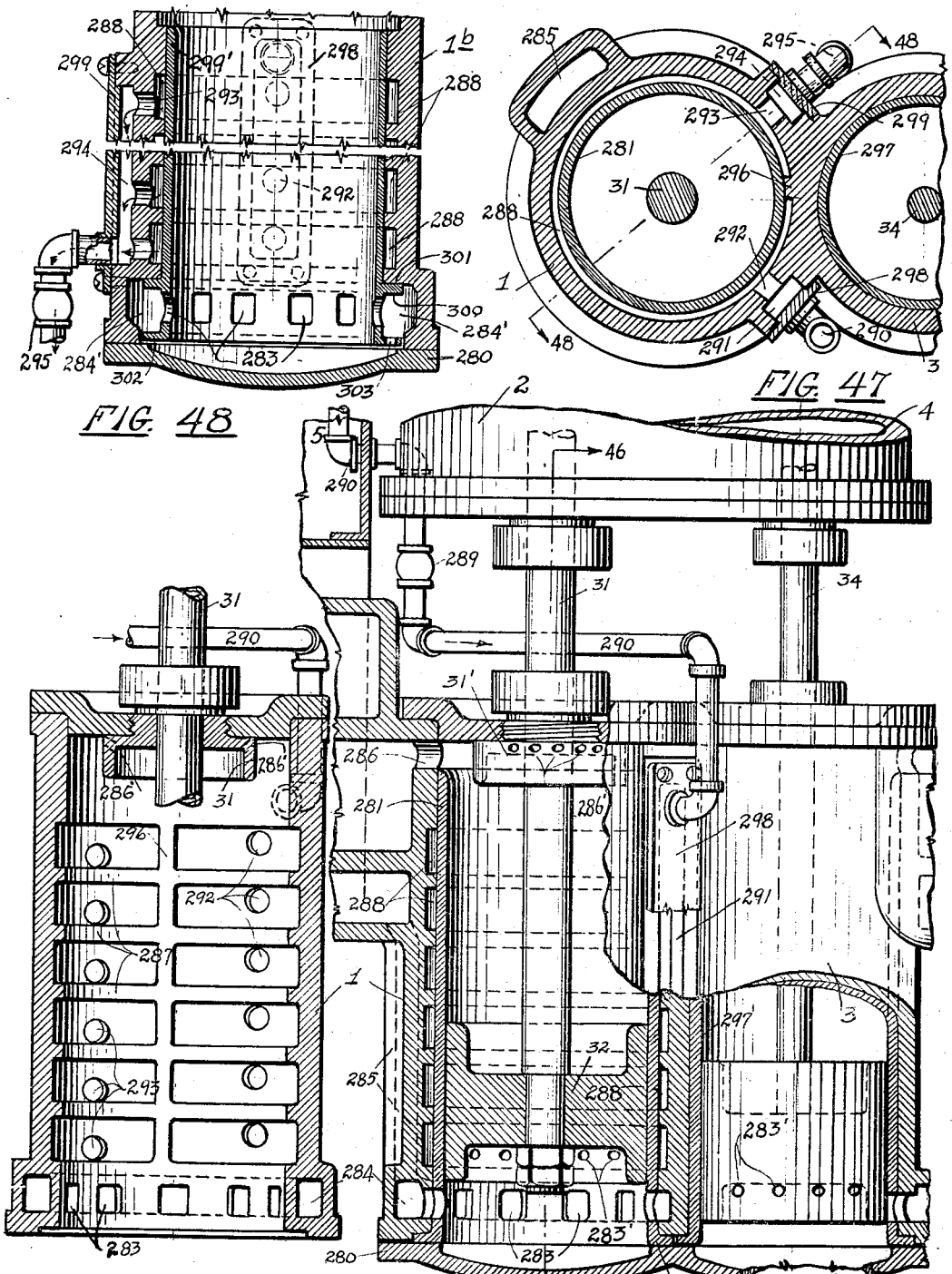
Inventor
Edmund H. Blunt,
By Attorney

May 7, 1935.  E. H. BLUNT  2,000,009
FEED WATER HEATER FOR LOCOMOTIVES, ETC
Original Filed Oct. 27, 1923   11 Sheets-Sheet 11

INVENTOR
BY Edmund H. Blunt,
ATTORNEY

Patented May 7, 1935

2,000,009

UNITED STATES PATENT OFFICE 2,000,009

FEED WATER HEATER FOR LOCOMOTIVES, ETC.

Edmund H. Blunt, Brooklyn, N. Y.

Application October 27, 1928, Serial No. 315,579
Renewed July 19, 1934

16 Claims. (Cl. 122—442)

This invention relates particularly to feed water heating apparatus of the type specially adapted to be used for locomotives, in which the supply pumps and the feed pumps deliver to and remove from the heating vessel, approximately fixed quantities of water, or in other words, where the ratio of incoming cold water and outgoing hot water remains substantially constant. Any substantial variation from the normal should be properly neutralized by some water-level controlled device.

An important feature of locomotive installation is to keep the vertical dimension of the apparatus as small as is practicable, as the attaching of same to the side of the boiler necessitates its being above the driving-wheel mechanism and below the line of vision of the engine man.

In an installation that requires a pump for supplying cold water to the heater vessel and a feed pump for removing the resulting heated water and delivering the same under pressure to the boiler, I propose using a low pressure, double acting supply pump and a high pressure, double acting feed pump, assembled side by side and operated by individual steam driven cylinders.

While the hot water pump should operate under a boiler pressure of say 200# per sq. inch or more, the cold water pump may only have to overcome a resistance of 20 or 30# per sq. inch when delivering water into the heating vessel. I propose to provide a system in which these different delivering pressures can be produced by the same boiler pressure in the two steam cylinders by the simple expedient of making the steam cylinder of the pump which supplies cold water smaller than the steam cylinder of the hot water pump. This results in economy in steam consumption.

The type of heater herein shown is generally known as an "open" or "contact" heater, in which the water is directly heated by exhaust steam in a vessel, and it is essential that a substantially constant water level should be maintained therein, or there will be at times a flooding or emptying of the same, as is well known. While I propose synchronizing the strokes of the two pumps and proportioning their piston areas so as to maintain the proper water lever under normal conditions, any considerable variation in the exhaust condensation entering the vessel will alter this balance.

To rectify this, I have designed a float controlled by-pass of novel construction to transfer excess water from one end of a pump to the other instead of allowing it to be first discharged into the vessel. This feature may be applied to either hot water pump or to cold water pump, or to both pumps as will be shown.

The entering cold water passes through a spray head that may have adjustable frictional resistances therein. A secondary spray may be used whose function is that of maintaining a steady spray of water into the heater vessel when the supply pump has momentarily stopped.

These adjustable resistances in the cold water delivery may be used to control the speed of the cold water pump. I have also shown a resistance introduced into the hot water delivery that may be used to govern the speed of the hot water pump.

To externally condense excess quantities of exhaust steam and carry away most of the contained air that would otherwise remain in the vessel, I have provided an air cooled condenser preferably situated above the heating vessel and capable of draining into said vessel or into the pump suction, thereby returning said drainage to the boiler. The greater amount of condensation thus recovered will mean a correspondingly less amount of water to be taken from the locomotive tender, and will be that much additional water saved.

When using a high pressure pump to supply the boiler feed and a low pressure, or low duty pump as a means of cold water supply, there may be a decided advantage in compounding the steam from one cylinder into the other. Also the outline of the adjoining steam cylinders is favorable to the formation of a very compact form of steam receiver for this compounding; such as surrounding the cylinders by a suitable jacket and thus forming a combined receiver and steam jacket about the cylinders.

To readily remove pump ends and make necessary repairs without being required to drain the vessel of its contained water, I have designed an interior plug or valve to the hot water outlet that can be readily operated from without the vessel.

To prevent the hot water pump from losing its heat by radiation, with a consequent cooling of its contents, I have designed what I will term as an "internal steam jacket," preferably supplied by excess exhaust steam from the heating vessel. It may be regarded as "internal" when compared to the usual type of "external" jacket that would be placed outside the cylinder.

A combination cold water bypass valve and a hot water bypass valve, both operated by a common water level float within the heater vessel, is also shown, as well as a special type of a balanced and adjustable steam valve, for admitting exhaust steam from steam driven auxiliaries into said heater vessel, whenever heating conditions may require it.

To prevent racing or a pounding of the hot water pump, due to a sudden steam pressure drop within the heater vessel, I have invented an automatically operated means of introducing additional resistance into the hot water delivery that will retard the speed whenever this pump requires slowing down. A mechanical substitute for the usual air-chamber to reduce shock on the water lines, is also shown.

Referring to the drawings—

Fig. 6 is a front elevation and section taken on the line 6—6 of Fig. 1.

Fig. 7 is a rear end elevation and section taken on the line 7—7 of Fig. 1.

Fig. 8 is a plan section thru the pumps on the line 8—8 of Fig. 1.

Fig. 9 is a front end elevation on the line 9—9 of Fig. 10.

Fig. 10 is a part side elevation of Fig. 9.

Fig. 11 is a part sectional plan of the heater vessel and showing secondary spray piping connections.

Figs. 12, 13, 14 and 15, are detail sections of a resistance valve for the hot water discharge pipe, as assembled in Fig. 33.

Fig. 16 is an elevation and section showing the float controlled special valves within the vessel.

Fig. 17 is a plan and section of the parts of Fig. 16 taken on the line 17—17 of Fig. 16.

Fig. 18 is a sectional elevation on the line 18—18 of Fig. 17.

Fig. 19 is a plan and section taken on the line 19—19 of Fig. 16.

Fig. 20 is a detail of the float valves of Fig. 16 while the float is in its low position.

Fig. 21 is a detail of the same with the float lever in its level or horizontal position.

Fig. 22 is a detail of the same with the float in its high position.

Fig. 23 shows a change in the relative positions of the upper and lower valve cams while the lever arm remains as in Fig. 21.

Fig. 24 is a section and elevation showing details of the valves in Fig. 20 taken on the line 24—24 of Fig. 20.

Fig. 25 is a part section detail of a foot valve leading to the air chamber of the secondary spray-head system.

Fig. 26 is a sectional detail of a balanced exhaust steam admission valve connecting the auxiliary exhaust steam supply with the heater vessel.

Fig. 27 is a side view of a locomotive feed-water heater, in connection with an air cooled condenser.

Fig. 28 is a rear elevation of the same on the line 28—28 of Fig. 27.

Fig. 29 is a similar front elevation looking towards the cab on the line 29—29 of Fig. 27.

Fig. 30 is a top view of the air condenser on the line 30—30 of Fig. 28.

Fig. 31 is a section plan of the condenser on the line 31—31 of Fig. 28.

Fig. 32 is a top plan of Fig. 33.

Fig. 33 is a side elevation of the pump and heater, as adapted to steam compounding.

Fig. 34 is an end view of details including steam piping on the line 34—34 of Fig. 33.

Fig. 35 is a plan and section of the compounding steam valve as assembled on the cylinder.

Fig. 36 is a plan showing steam ports in the cylinder head when the valve is removed.

Fig. 37 is a vertical section of part of the steam cylinder on line 37—37 of Fig. 36.

Fig. 38 is a vertical section of the upper part of the cylinder on the line 38—38 of Fig. 35.

Fig. 39 is a plan view and section of a combined primary and secondary spray-head within the heater vessel.

Fig. 40 is a vertical section of the secondary spray-head on line 40—40 of Fig. 39.

Fig. 41 is a vertical section of the spray-head on the line 41—41 of Fig. 39.

Figs. 42, 43 and 44 are sections of the spray-head taken on the line 42—42 of Fig. 39, showing three positions of the inside resistances.

Fig. 45 is a part sectional elevation of adjoining pumps and shows an inner pump lining forming part of an interior steam jacket.

Fig. 46 is a section of the pump barrel and taken on the line 46—46 of Fig. 45, but with the interior lining removed.

Fig. 47 is a horizontal section thru the pumps and shows an annular steam heating space.

Fig. 48 is a fragmentary vertical section on the line 48—48 of Fig. 47 and shows a double flange at the bottom as part of the pump lining.

Figure 1:
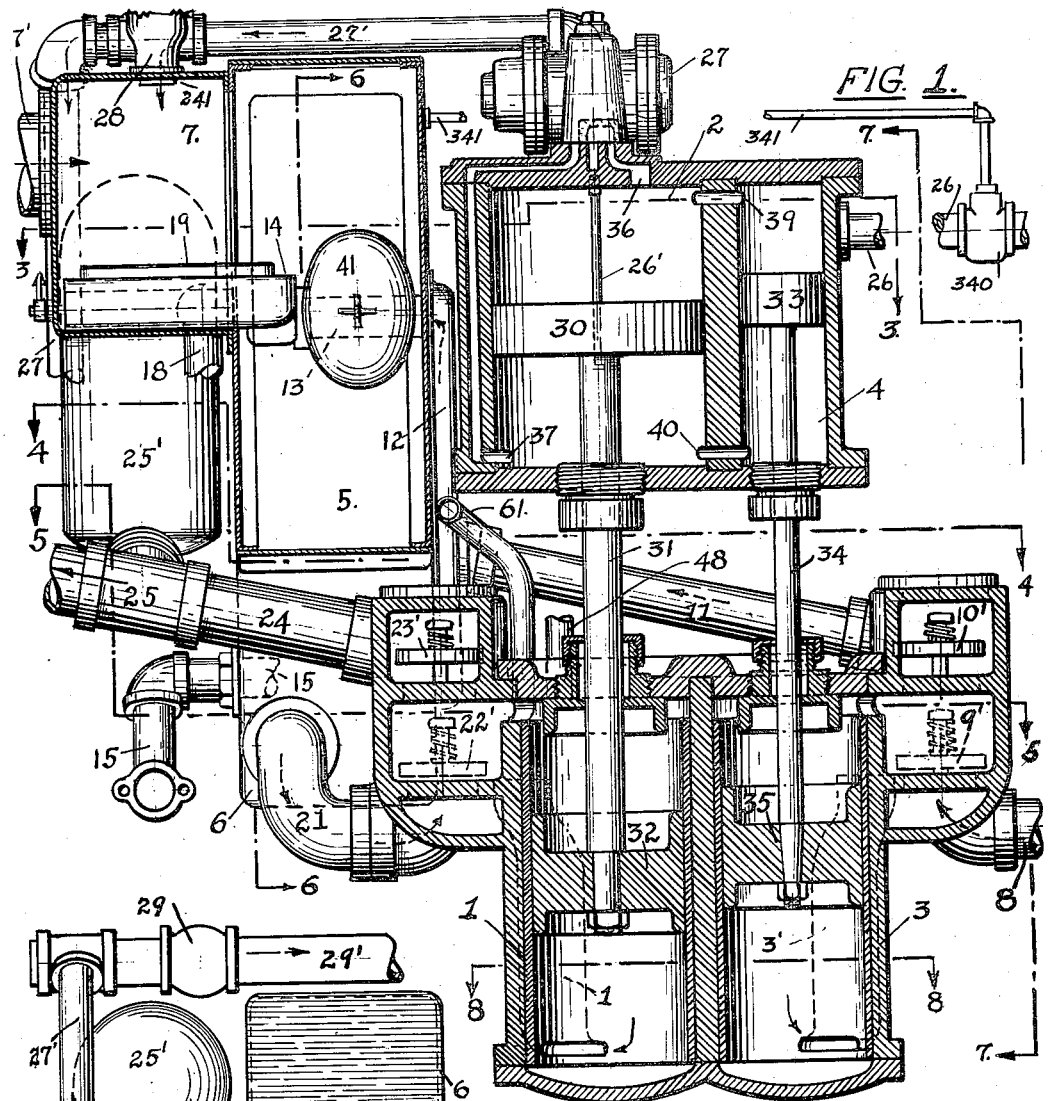
Fig. 1 is a section and side elevation of the heater on the general plane of the line 1—1 of Fig. 6.

The hot water feed pump is 1 and has a steam cylinder 2 (see Fig. 1 et al.). The cold water supply pump 3, has a steam cylinder 4. 5 is the main portion of the attached heating vessel, with a rear extension 6 and a lateral addition 7, while 7' is an exhaust steam supply conduit connected with said vessel.

8 is the cold water connection to the pump, 9 and 9' are inlet valves for top and bottom ends respectively of the cold water pump, while 10 and 10' are top and bottom discharge valves for the same, delivering the water thru conduit 11 to the hollow attachment 12 on the vessel body 5, and through 13 to the primary spray-head 14, by which it is jetted into the steam filled space of the heater vessel, there becoming heated, and collecting in the bottom of said vessel.

This cold water delivery to the spray-head may under certain conditions become intermittent, as will be later shown, and will not always condense the steam in a uniform manner. To remedy this, I propose leading some of the incoming cold water from the bottom of conduit 12 into a lower conduit 15, through the special valve 16 and store it temporarily in a secondary air-chamber 17, (Fig. 9).

At the end of the pumping stroke the pressure will fall in 15 and an unbalanced valve 16 (shown in detail on Fig. 25), closes 15 and opens into conduit 18 allowing the contained water of 17 to flow into the secondary spray-head 19 (see Figs. 3 and 39), so that when water ceases flowing through the orifices, 25θ of the primary spray-head 14, a further supply goes through 18 to the secondary head 19 until a new stroke of the pump puts pressure again on the valve in 16 and closes the entrance to 18.

To shut off the contained water of the heater vessel during repairs, I propose using an interior valve normally clear of the hot water outlet, but adapted to be closed and also held to its seat by the pressure of the water behind it.

Figure 5:
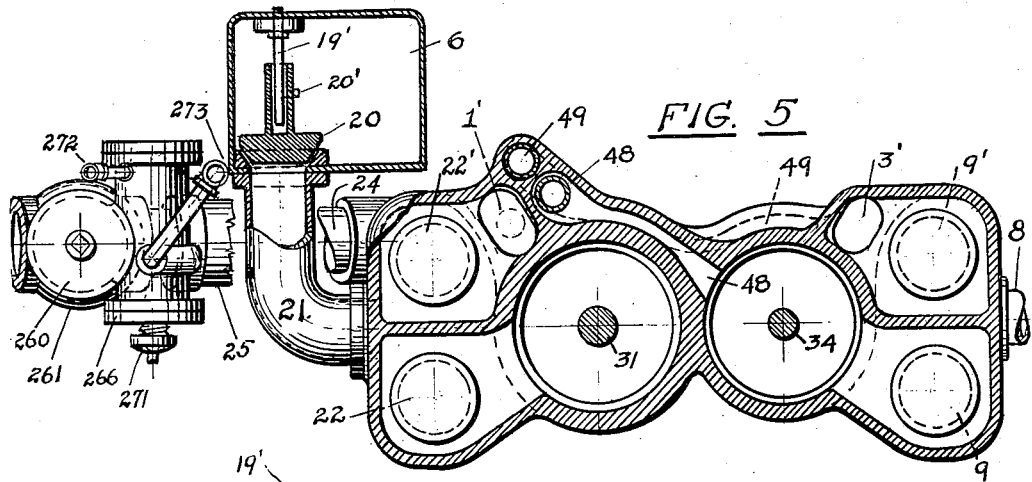
Fig. 5 is a sectional plan taken on the line 5—5 of Fig. 1 and of Fig. 33.
Figure 4:
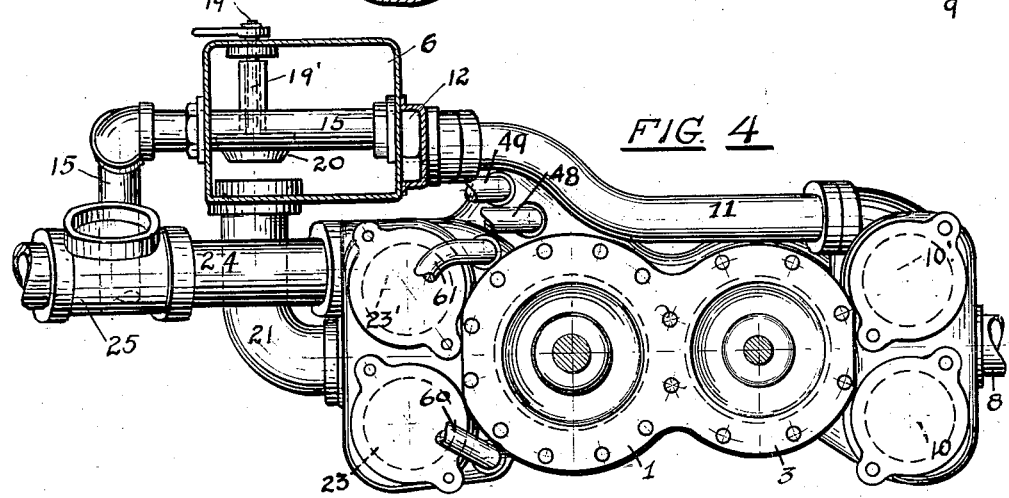
Fig. 4 is a sectional plan taken on the line 4—4 of Fig. 1.

This valve 20, shown as open in Figs. 4 and 9, and in a closed position in Fig. 5, is preferably operated from without, such as by revolving a shaft 19' carrying a pin 20' and travelling in a spiral slot in a hollow cylinder attached to 20. Shaft 19' on being revolved will cause valve 20 to be properly seated. Valve 20 opens into hot water conduit 21, leading to the suction valves 22 and 22' of the top and bottom ends of the hot water pump 1.

The hot water discharge valves 23 and 23' from the top and bottom of pump 1 connect with conduit 24 leading to the boiler 1a. Attached to 24 by a fitting 25 is the main air-chamber 25'. The strokes of the hot and cold water pumps are to be synchronized and the ratio of cold water and hot water volumes maintained in a manner to be later described.

In the conduit 24 and preferably adjacent to air chamber 25', I propose inserting an automatic resistance device to the flow of hot water, as shown in Figs. 5, 33 and others, which will be described later.

Live steam for operating the pumps may enter as at 26, (Fig. 1), and go by a passage (not shown) to a steam operated main valve 27, which may be controlled by a tappet rod such as 26' in a well known manner, the exhaust steam passing into the conduit 27', through special valve 28 into vessel 7 or into pipe 27', adjustable valve 29, conduit 29', and thence to waste or otherwise, according to pressure conditions within the heater vessel.

In Fig. 1 is shown the piston 30 of the large steam cylinder 2, and rod 31 connected to the hot pumping piston 32, also the smaller steam piston 33 with rod 34 connected with the cold pumping piston 35. Steam passages 36 and 37 distribute the live steam from valve 27 to opposite ends of cylinder 2.

To simplify pump synchronization, I propose using a single steam valve 27 to deliver live steam to both steam cylinders. The upper steam port or conduit 39 and lower port or conduit 40 respectively, connect the top and bottom ends of the large and small cylinders and tend to cause a simultaneous starting of both pumps. If preferable, the upper end of one cylinder can be ported to the lower end of the other, and vice versa, the simultaneous starting still occurring but the pumping strokes being in opposite directions. It will be observed that the travel of the larger piston governs the pumping cycle.

To make sure the cold water pumping piston delivers its proper amount of water to the heater and so maintains the predetermined hot and cold water ratio, I propose to establish a slightly greater piston speed for the cold pump. This may be accomplished by using a proper area for piston 33, with an adjustable cold water delivery restriction in the spray-head, as shown in Figs. 30 to 44.

At the end of each stroke, a water cushioning device as shown in Fig. 45, comes into action and the pump remains at rest until reversed. As this is a low duty pump, the total resulting shock becomes negligible.

To prevent an excessive rise above the normal water level within the heater vessel, I have employed the principle of the pump operated, excess cold water bypass valve shown in my U. S. Patent #1,551,727, dated Sept. 1, 1925, as here illustrated in Figs. 16 to 24 of this application.

A similar means is used to prevent excessive lowering of said water level by the use of a hot water bypass valve to be shown and described along with the above cold water bypass.

Starting with Fig. 16, 41 is a partly immersed float valve in its low water position while 41' indicates the high water stage. The float lever 42 has a counter weight 42' and is supported by shaft 43, on which is also mounted a cam, eccentric, wedge or other device 44, that permits a varied vertical travel of the stem 45 of the cold water bypass valve 46, contained within the valve body 47.

Conduit 48 connects the underside of valve 46 with the upper end of cold water pump 3, while conduit 49 connects the top side of 46 with the lower end of said pump. The opening of valve 46 allows cold water to pass from the bottom to the top of the cold water pump (see Figs. 5, 16 to 19).

Referring to Figs. 20 to 24, the eccentric or cam 44 is shown with a curved perimeter whose center coincides with that of the shaft 43 and continues to be developed until a point 50 is reached, beyond which the curve is reduced to a point 51, with a center at 52. An adjustable extension 45' of the stem 45 may be used to keep it in contact with the perimeter of the cam 44.

While rotating 44 until the float lever 42 becomes approximately horizontal, as shown in Fig. 21, the valve stem is kept at a radius distance from the shaft 45 and cannot progress downward or the valve 46 leave its seat. On a further travel upward of the float, the point 50 is passed by said stem extension, and the nearer it approaches the point 51, the greater becomes its travel towards 43; being on the arc of a shorter radius 50 (Fig. 22).

The interval between the arrows at 53 shows the maximum opening of the valve between the low and high float positions. As 45' is free from cam 44, the pump pulsations, gravity, a spring seating device (not shown) or other means can come into action to operate the valve.

A similar control of extreme low water conditions may likewise be installed. Owing to some accidental disturbance of the hot and cold water ratios, a low water level might not have sufficient hydraulic head to quickly fill the hot water pump, but would leave a space in front of the reversed stroke of the pump and a disasterous water hammer might result from this condition. By automatically returning what I elect to term the "deficit hot water", through a similarly pump operated bypass valve, such as 58, a less proportion of hot water will be permanently lost to the heater vessel, and the water level will be the more easily maintained.

Instead of returning it directly to the vessel I propose passing a varying amount back to the opposite end of the hot water pump as the water level changes, in a similar manner to that of the cold water system.

Let 54 be a cam or eccentric for controlling the hot water bypass valve. 55 is a vertically adjustable end of the valve stem 56, and passes through stuffing box 57 and connects with valve 58 that may register on the valve seat 58', Fig. 20. Hot water valve body 59 has a lower passage 60 that connects with the top of pump 1, while the upper passage 61 communicates with the lower end of pump 1 (Figs. 4, 16, 18 and 19).

In Fig. 22 showing the high position of the float, it will be seen that the valve stem extension 55 cannot travel towards the shaft; while in the low position shown in Fig. 20, the vertical valve play is the interval 62 between the lines. The position of one or both cams 44 and 54 may be shifted or rotated on the shaft 43, with respect to the float, as in Fig. 23, thereby changing the time at which the valves commence functioning and by this means establishing a new average water level within the heater vessel.

In Fig. 23 where the position of the float is similar to that of Fig. 21, cam 44 has been rotated to the right and a gap 63 has developed, thereby opening up valve 46, while it still remains closed in Fig. 21. On the contrary, a reverse movement of 44 to the left (not shown) would delay the valve opening until point 50 came under 45', the general effect being to raise the average water level.

An external tell tale 64 fastened to the shaft 43 and preferably contained in a box with a transparent cover 65 may be used to indicate the position of float 41.

It will be readily seen that the bypass valves 46 and 58 are operated by the pump pulsations, but only when the float has rotated the cams sufficiently to open up at the gaps 53 and 62 for the respective pumps; also that the float has merely to exert itself between pulsations, when most of the pressure is removed from the valves. By this system all float failures due to corrosion or to tight connections may be eliminated, as slight valve stem leaks would remain within the vessel and little if any packing of said stem would be required, thus reducing friction to a minimum. Positive and reliable float action is thereby assured.

On Fig. 25 the details of the foot valve 16 are shown. Its location is also given in Figs. 9, 10 and 11. Excess cold water enters from 15, lifts the large disc valve 66 off its seat 67, until the smaller valve 68 (adjustably connected to 66 by stem 69,) seats itself against the edge and closes the opening 70.

The cold water passes thru 67 and 71 into air chamber 17, until a proper pressure is established therein. When this pressure diminishes, due to the cold water pump completing its stroke, the unbalanced pressure of the air within 17, acting against the unequal areas of the discs 66 and 68, closes the opening at 67, and uncovering the opening 70, allows water to pass into 18 and thence to the secondary spray head 19 (see Figs. 3, 9, 10 and 39).

In modern feed water heater practice, the use of a steam and air vent to the atmosphere is desirable as a means for preventing the heater from becoming "airbound", and the greater the amount of vented steam, the greater will be the amount of escaping air, resulting in a diminished pitting of the boiler tubes.

Figs. 27 to 29 and condenser sections Fig. 30 and 31 show the installation of a combined boiler feed apparatus and air-cooled condenser, as assembled on the left side of a locomotive, in which 80 is a part section of the locomotive boiler, 81 its running board, 82 a feed pump, 83 the operating steam cylinder (or cylinders) 84 the cold water supply line to pump 82, while 85 is the feed line to the boiler.

The heater vessel 86 has a supply conduit 87 for steam heat, a water conduit 88 from the pump. An exhaust steam outlet 89 with an adjustable or automatic relief valve 90, has an excess steam conduit 92 connecting to an air cooled condenser 91, having interior condensing tubes or elements, 93 that will pass the uncondensed steam and included air into an outlet 94 from the condenser, thru adjustable relief valve 95 and pipe 96 to the atmosphere or otherwise.

Cold air inlet 97 to the condenser is preferably placed at the forward end to take advantage of the speed of the locomotive. A flaring flange 97' may be employed to force a greater quantity of air against the steam elements 93 to give the maximum condensation. The air outlet 98 from the condenser, is shown at the rear.

Steam condensation in the tubes 93 will fall to the enclosed bottom 93' and flow thru pipe 99 to a special container 100, that is designed to form a water seal against any reverse flow of steam or water in the pipe 103, thereby insuring a proper flow of escaping steam thru 89 and 92 to the condenser.

Container 100 has an outlet valve 101, closed when the water in 100 lowers the interior float 102 sufficiently to seal the discharge of valve 101 into pipe 103 that drains toward the heater vessel 86 or pump. With sufficient condensation from condenser 91, container 100 will have enough water within to lift float 102 and thereby keep valve 101 open. It is intended to have enough vertical head of water above valve 101 so that, combined with the weight of valve and parts, it will be greater than any vessel pressure that would force the steam back thru pipe 103.

Pipe 103 should drain into 86 at some such point as 104, high enough to be readily reheated by the steam within the heater vessel. It is desirable to drain this condensate to the feed pump system when using this type of condenser with a closed or pressure heater.

By adapting this air cooled condenser 91 to a feed water system we will get rid of otherwise objectionable quantities of escaping steam that tend to cloud the engineman's vision. At the same time a saving in water consumption is assured by this air condensation and a corresponding reduction in the amount of minerals formerly discharged into the boiler is secured.

Instead of using live steam to operate the small cylinder of the cold water pump as shown in Fig. 1, it might be advantageous to use a slightly larger cylinder, and compound the exhaust from the large cylinder into it. To simplify matters a single steam valve could be used for both pumps, the travel of the larger hot pump piston governing the cycle, and the cold pump running at a greater speed, to be controlled as formerly described.

On Fig. 33 is shown a side elevation of such a design, while Fig. 32 shows a top plan of the same. Identity numbers on pumps and heater remain substantially the same. The compounding valve body 200 is also shown in Figs. 35, 36, 37 and 38.

Its interior has a cylindrical bushing 201 and has opposing steam ports 202.

This steam operated main valve 203, has a large piston 204 at the right end, a smaller piston 205, at the left, with four cylindrical slides 206, that travel with and are a part of the valve, and cover and uncover the various ports 202, in a well known manner. Slotted ports 207, 208, 209, 210 and 211, Fig. 36, lead respectively by passage 212 to the bottom of the high-pressure steam cylinder 2 and by passage 213, to the top of the low-pressure cylinder 4 and by passage 214 to steam-jacket receiver 217, and by passage 215 to the bottom of cylinder 4, and by passage 216 to the top of cylinder 2.

Passage 218 is an exhaust steam connection to rear piping 219, with a check valve 220 and a cross fitting 221, while passage 222 (Fig. 35) is an exhaust connection to the front piping 223, with a check valve 224 (Fig. 32) and also connecting with cross fitting 221. From the bottom of 221, a conduit 225 with check valve 226 admits steam to the receiver 217, enclosed by jacket 217′.

Figure 2:
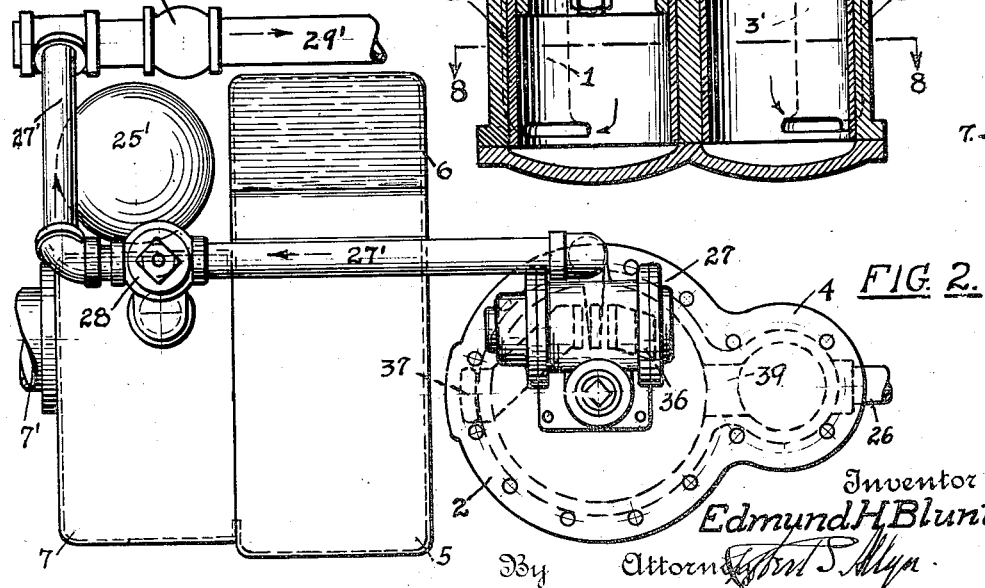
Fig. 2 is a top plan of the parts shown in Fig. 1.

From the top of cross 221, piping 227 with a regulating valve 228, connects with special valve 28 (detailed in Fig. 26) and thence to the heater vessel or to the exhaust connection 29′ and the atmosphere as shown in Figs. 1 and 2. A steam outlet 229 with interposed regulating valve 230, connects with 227 and can be used to prevent excessive pressure within the receiver. Live steam enters at 231, Figs. 3, 5 and 38, and by passages 232 and 233 to the respective inner faces of valve pistons 204 and 205.

With the outer faces of pistons 204 and 205 at atmospheric pressure, the valve 203 will be to the right. Live steam from 233, passing through holes 202 will enter 207 and 212, causing the large steam piston of cylinder 2 to rise. Reduced pressure steam from receiver 217 will pass through 214 and slot 209 into slot 210 and passage 215 to the bottom of the small piston, causing it also to rise. When the large piston rises sufficiently, it causes the tappet rod 234 to shift the auxiliary steam valve 235 in a well known manner, thereby admitting live steam pressure to the outer face of piston 204, by steam passages (not shown) and valve 200 will shift to the left, due to unbalanced steam pressure on piston 205.

High pressure exhaust from below will then pass out through 212, 207, holes 202 into and through 219, 220, 221, 225 and 226 to receiver 217, as well as through the top of the cross 221, 227, etc. to the atmosphere or otherwise, as described. A proper adjustment of valve 228 will regulate the steam flowing to the receiver and also the resulting pressure. Any excess pressure can be regulated by the valve 230. As soon as a pressure drop occurs in 227, any back flow from the receiver is stopped by check valve 226 and the steam is retained in the receiver at the required pressure. This charging of the receiver is extremely rapid and will not interfere with the secondary exhaust from the low pressure cylinder.

On the shifting to the left of the steam valve 200, the low pressure exhaust from below will enter 215, 210 and holes to passage 222, piping 223 and valve 224, as soon as the momentary pressure drops sufficiently in 227, this exhaust then escaping to the atmosphere.

At the same time, live steam passes from passage 232 into 211 and passage 216, to the top of the high pressure piston, forcing it downwards, while the low pressure steam from receiver 217 flows through 214, 209, 208 and into passage 213 to the top of the piston of steam cylinder 4, also forcing it downward. On reaching the lower end of its stroke, the piston of cylinder 2 pulls down the tappet 234 and the valve 235, thereby releasing live steam from the outer face of piston 204 in a well known manner and allowing the unbalanced internal steam pressure to return the steam valve to the original position as shown in Fig. 38; thus completing the cycle.

Fig. 26 is a detail of an auxiliary exhaust steam admittance valve 28, as shown in Figs. 1, 2, 32 and 33. Passage 239 connected to pipe 27′ of Fig. 1 may be regarded as the entering connection of any auxiliary steam supply to this valve, and 240 is any connection by which the steam may normally escape to atmosphere by means of pipe 29. Also 241 connects with the heater vessel, while 242 is a valve seating on 243 and freely travelling on and supported by stem 244 which is capable of vertical adjustment, as by the thread 245 in the cap 246. An adjustable spring 247 is mounted on 244 and tends to keep the valve normally off the seat, regulating the steam admission.

The valve should be light and of large area so that its vertical travel need be comparatively small and to open and close on slight changes in the steam pressure. At steam pressures within the heater vessel under normal operating conditions, the valve should be adjusted so that this pressure keeps it seated. When this vessel pressure drops below a predetermined point the spring will cause the valve to lift and admit a certain amount of auxiliary steam. It will be seen that when only atmospheric pressure exists within the vessel, the auxiliary steam may enter without excess pressure while at slightly higher heat pressures the valve will close.

Figure 3:
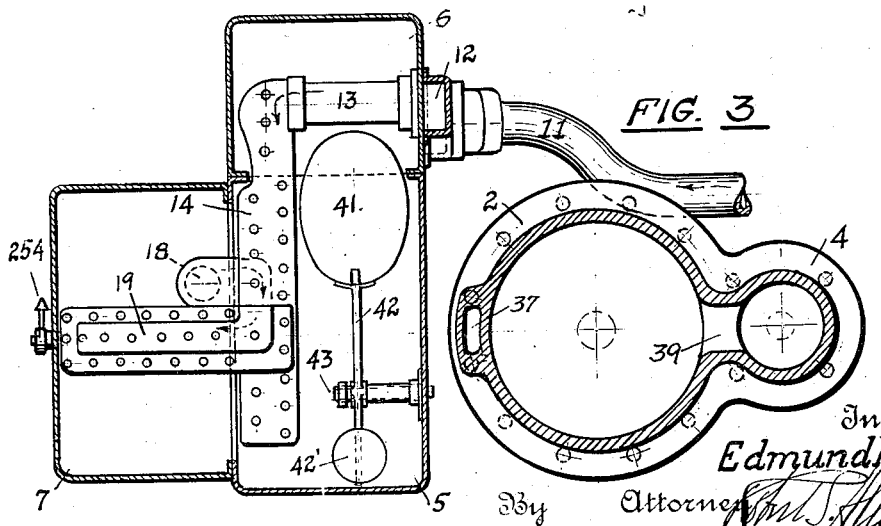
Fig. 3 is a sectional plan view taken on the line 3—3 of Fig. 1.

The combined type of primary and secondary spray head and means for introducing variable resistances in it are shown in Figs. 39 to 44, while its assembly with the supply piping and adjoining float is shown in Fig. 3. The primary spray head 14 with discharge orifices 250, 251 and 252 is supplied through 13 by the cold water pump 3. Before reaching 251 and 252, the water flows through a hollow cylinder 253 within the spray body and capable of being rotated by external means such as a lever at 254 attached to shaft 254′. Said cylinder has peripheral ports such as 255, at times connecting with openings 251, also ports 256, discharging into openings 252, while at other times the rotation of 253 first shuts off openings 251 while a further rotation closes the openings 252 leaving only the openings 250 through which the water can be sprayed.

Fig. 42 shows both 251 and 252 being supplied with water. Fig. 43 shows a partly rotated cylinder which supplies 252, while in Fig. 44 a further rotation cuts them both off. This device shows three stages of resistance that give three different pump speeds, and can be used to regulate the travel of the cold feed pump whenever necessitated by the pump speed control demands.

The secondary spray head 19 is here located between and above openings 251 and 252. Cold water coming from air chamber 17 goes through 18 to passage 257 and is forced through openings 258 into the heater vessel. Changing the relative numbers of these openings, such as by the plugging of some and the opening of others, will give varying resistances and corresponding changes of pump speeds.

To maintain the maximum pump speed, it is necessary that the hot water supply flows readily from the heater to the hot pump, as otherwise a disasterous water hammer may occur. As this apparatus is designed within minimum vertical dimensions, not much reliance should be placed on the hydraulic head established, so I intend to take advantage of the high internal steam pressure of the vessel when operating near capacity.

However, any sudden falling off of said pressure will have disasterous results unless the pump speed can be immediately reduced. This reduction I propose to accomplish automatically. As one such way I have shown automatic resistance introduced into the hot water pump discharge, this being especially necessary where the hot-pump speed governs the pumping cycle.

Though three or more different pump speeds may be desirable, I have here shown but two. I propose to vary the speed in some direct ratio to the pressure within the heater vessel, such as by increasing the resistance to the hot pump discharge in an inverse ratio to the vessel pressure. But a device operated directly by slight variations of pressure within said vessel would not generally develope enough power to over come the friction incurred in moving such a mechanism, such as I propose introducing into the high pressure conduit leading to the boiler.

Fig. 34 shows my proposed device in conjunction with a feed water heater system, with a plan view in Fig. 3 and details in Figs. 12, 13, 14 and 15.

A drop in heater pressure below a predetermined limit is used to admit live or high pressure steam to an unbalanced piston, whose travel tends to revolve a disc or other obstruction across the path of the hot feed water, and so increase the resistance, as will be shown. Above this pressure limit, the boiler feed pump may maintain its maximum speed, while any drop below this limit causes live steam to be brought into action, resulting in an immediate slowing down of the pump.

An upper valve body 260 (see Figs. 12, 13, 14 and 33) is attached to a lower body 261, through which flows the boiler feed from conduit 24. The body 260 contains an inner piston 262 with a larger upper head whose outer face at times is exposed to boiler pressure and the inner face to approximate atmospheric pressure and is connected by a rod to a smaller diameter piston 262', the inner face of which is at nearly atmospheric pressure while its outer or lower face is in contact with the boiler feed flowing through 261 and thus subjected to that pressure.

An extension of this valve into the body 261, preferably in the form of a stem of square cross section to pass through a square guide and so keep the valve 262 from rotating, carried a disc 263 mounted on a hollow spindle 264 with a diagonal groove 264', in which travels a pin 265, fastened to the square stem of valve 262 and capable of rotating said disc as the valve and pin travel up and down.

Adjacent to 260 is another valve body 266, containing a valve 267, having a stem 268 that may move the slide valve 269, but is kept in position by the adjustable spring 270 that may be regulated by rotating the exterior handle 271. The outer face of valve 267 is subjected to the steam pressure within the heater vessel 1 which is brought by the pipe 272 (see Fig. 33). Pipe 273 conveys live steam from the pump steam line to passage 276 in valve body 266. A drain 274, maintains atmospheric pressure on inner faces of pistons 262 and 262'. Set screw 275 regulates the travel of the double piston valve 262.

High steam pressure is maintained at all times in passage 276 by pipe 273. When the vessel pressure is above the critical point, it forces the valve 267 against the adjusted spring 270 and maintains the slide valve 269 operating over ports 276, 277 and 278, in the position as shown, and the live steam goes from 276 into passage 277 and into the top of 260, forcing down the valve 262 into the position shown in Fig. 12. While the top of 262 is substantially under the same unit pressure as the bottom of 262' in contact with the water, (both being under boiler pressure) the larger area of the upper piston is sufficient to rotate disc 263 and keep it down in the position as shown.

Under these conditions the disc 263 is kept parallel to the flow of water and a minimum resistance is encountered. Fig. 15 shows a section-plan of body 261 with a disc in full lines while in its non-resistance position, and it also shows it in a dotted position as 263' where it opposes the flow of water and builds up a resistance.

When the vessel pressure through 272 drops until it is unable to oppose the spring 270, the valve 267 and slide valve 269 shift to the right, covering live steam port or passage 276 but allowing the steam in 260 to escape thru 277 and into passage 278 and to the atmosphere. Then the unbalanced pressure exerted on the lower piston 262' by the water pressure in the lower body 261 causes the valve pin 265 to rise, thereby rotating the disc 263 against the flow of water into the position 263'. It is not necessary for this disc to entirely close the passage or to revolve ninety degrees. Experimenting will determine the amount of resistance required.

A means for the "interior" steam jacketing of a hot water pump to prevent a temperature drop of its contents is shown in Figs. 45, 46, 47 and 48. As long as the steam supply is in excess of the condensation, no appreciable internal loss of heat will occur. I propose using excess exhaust steam from the heater to accomplish this, draining the resulting condensate away.

Outside or "exterior" steam jacketing would require an outer containing shell and insulation to retain the heat, thus increasing the bulk of the pump, besides making it difficult to adapt to the outside irregularities of the apparatus. By my method, this inside jacketing can be carried up into the body of the casting, well beyond the limits otherwise imposed by the valve chambers were the outside method of jacketing used. As the outside body of the pump barrel would help retain the heat, only a thin outer insulation would be required with my device.

Fig. 45 shows two adjacent pumps, only the left one having been jacketed. No. 31 is the hot water piston rod operating through the combined stuffing box and water cushion 31' to move the pump piston 32. Let 280 be the lower head of the pump, 281 the pump cylinder lining with a bottom flange 282 bearing against or fitting into the pump barrel. Outlet holes 283 in this lining at its lower end allow passage of water to annular chamber 284 that communicates with the valve chamber above by passage 285.

Small openings 283' within the lower cup of piston 32, allow entrapped air to escape to 283 at the end of the stroke. On the completion of the down stroke the lower edge of the piston increasingly intercepts water flowing through ports 283 progressively brings the pump stroke to a stop, while at the end of the upstroke the upper edge of said piston intercepts water, that is passing out through 286 and the small holes 286' in the upper part of stuffing box 31'.

Fig. 46 shows a section of the pump barrel with the lining 281 removed, also showing internal ribs 287 that, in conjunction with the removed lining 281, form a number of narrow annular passages 288, to be heated by steam. For instance, exhaust steam is conveyed from the heating vessel 5, through non return valve 289 and pipe 290 to a connecting passage 291 with holes 292 that permit steam to fill the passages 288, while other holes 293 drain the condensate from these annular passages to another connecting passage 294, then passing outside the pump barrel through regulating valve 295 from which it can run to waste.

These passages are arranged so that the condensate does not block the flow of steam to any essential heating surface. A vertical rib 296 causes the steam to take the longest path between 291 and 294. Lining 297 of cold water pump 3, such as is used in common practice, shows the difference between the two pump lining systems. A detachable cover 298 forms passage 291 and a similar cover 299 forms passage 294.

A modified cylinder lining is shown in Fig. 48 and is numbered 299', with a principal flange 300 bearing against an inner shoulder 301 of the pump barrel, 1b, preventing water from entering lower annular passage 288. A lower secondary flange 302, loosely fitting said barrel, forms an annular passage 284' connected to the passage 285, that leads to the pump valves.

Extra admission holes 303 in flange 302, a number of which may be opened or closed as required (such as by plugging), provide adjusting means for governing the cushioning at the end of the down stroke, such as by varying the total area of these discharge orifices and thereby altering the frictional resistances. In Fig. 48 the pressure in passage 284 tends to seat flange 300 against shoulder 301 and to tighten the joint.

Should the temperature of the water within the pump lining reach 212° F. there could be no transfer of heat to without said lining, as the surrounding steam in the spaces 288 would have at least the same temperature and there would normally be enough exhaust steam from the heater vessel to make up for any condensation that might occur by heat transmission through the comparatively thick metal of the pump casting, 1b, to the outer surface.

Interior arrows show the general flow of this exhaust steam around the inner lining, finally passing out to the atmosphere through valve 295, together with the accumulated condensate.

To eliminate the possibility of water hammer, for instance, in the cold water suction line to the pump at the end of each suction stroke, due to the surge set up, I propose employing a substitute for the usual air chamber.

Figure 49:
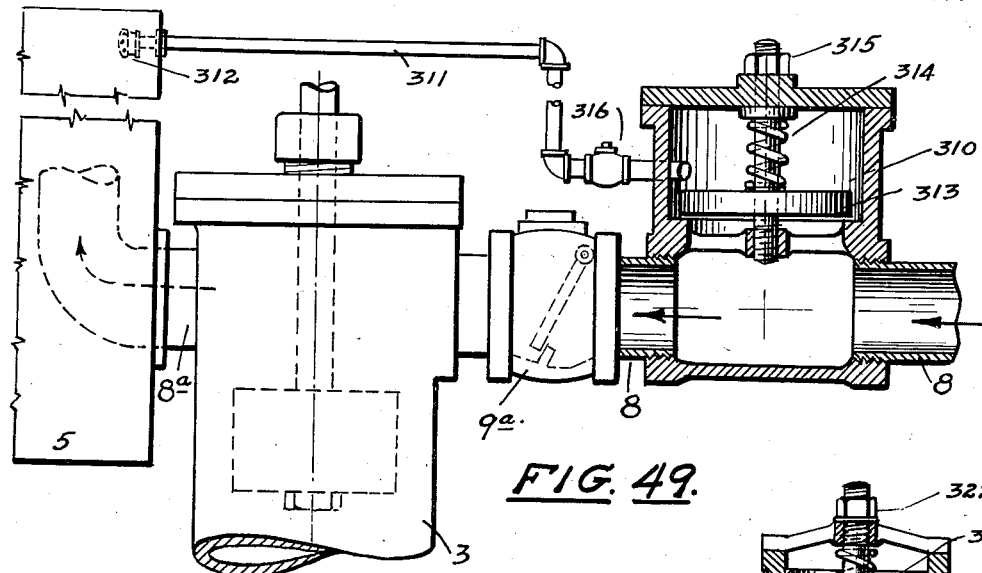
Fig. 49 shows a mechanical substitute for the usual type of air chamber, as attached to the inlet of the water supply pump.

In Fig. 49 is shown portions of a feed water heater vessel, of a cold water pump with suction or inlet valve, a discharge to the vessel, also a novel form of surge valve and an excess cold water bypass to said vessel. Interior arrows show the normal flow.

The cold water supply conduit 8 to the pump 3 has a surge valve chamber 310 connected by pipe 311 to a spray head 312 in the heater vessel 5 while 8a is the pump discharge to 5. A movable valve 313 is pressed down by spring 314, adjusted by nut 315. A check valve 316 is placed in the line 311 and the inlet valve 9a is located between the chamber 310 and the pump cylinder 3. Whenever a sudden closing of the valve 9a sets up a surge pressure in the line 8, the valve 313 opens and allows the water to pass to the spray head 312. When the surge ceases, the spring 314 will close valve 313.

Figure 50:
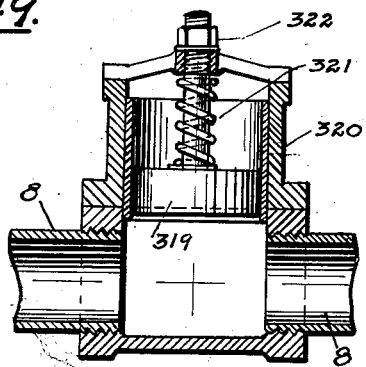
Fig. 50 is an alternative design of a substitute for Fig. 49.

Fig. 50 shows a modification in that a piston 319 travelling within the modified surge body 320, is opposed by the spring 321, adjustably regulated by the nut 322. This piston is adjusted to rise and relieve the momentary impact from the sudden stopping of water within conduit 8 but it is immediately returned to its low position again by the action of the spring in time to receive the next stroke. This apparatus may be made small and compact and will not take up the space usually required for an airchamber.

An air chamber or other suitable surge device is required on the hot water discharge line to the locomotive boiler and should function at all times so to avoid disastrous water hammer. It seems that water under substantial pressure tends to absorb the air within said airchamber. In addition, water derived from an open type feed-water heater equipped with the proper means for removing the contained air (such as by a venting to the atmosphere) would have a greater capacity for air absorption and thereby rapidly reduce the efficiency of the air chamber.

Figure 51:
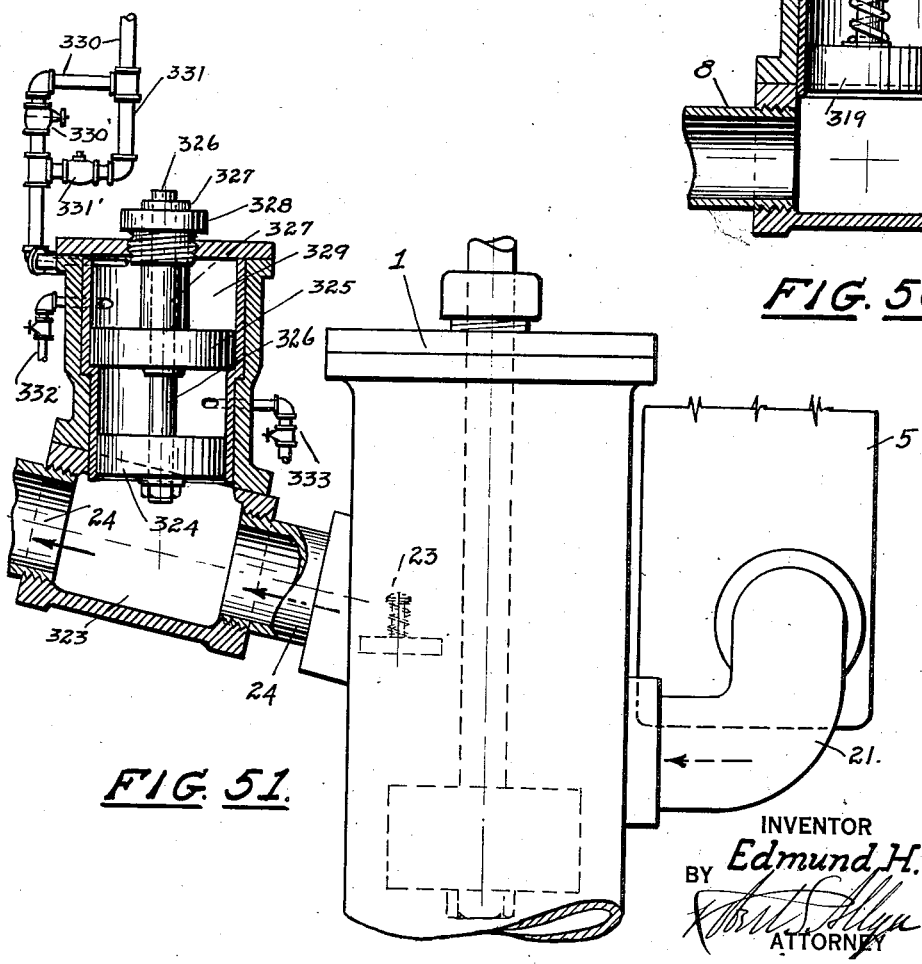
Fig. 51 is a mechanical surge chamber on the discharge line of the boiler feed pump.

In my proposed mechanical substitute I intend using the elastic properties of steam in place of the confined air of the present air chamber and separate the steam from the water by a travelling piston such as shown in Fig. 51.

Let 5 be the heater vessel, 21 the hot water conduit to hot water pump 1, 23 the hot water discharge valve, 24 the hot water conduit to the boiler and 323 a special valve body inserted into the pump discharge conduit 24, preferably in place of the fitting 25 and the air chamber 25'.

Within the body is a water tight piston 324 whose lower surface is in touch with the water delivered to the boiler. It is connected to a piston 325 by the common valve stem 326 that preferably extends without the valve body, as through the stuffing box 328.

The upper surface of valve 325 is in contact with and exposed to, the pressure of steam in chamber 329 delivered through pipe 330 and regulated by an adjusting valve 330', this steam being preferably live steam and of the same unit pressure that exists in the hot water conduit 24. A steam bypass 331 and check valve 331' may be inserted, as shown.

The stem 326 above the valve 325 may have a removable sleeve 327 of varying diameters adapted to pass through stuffing box 328 with like adjustments. While the surface areas of the top of 325 and the bottom of 324 when once established will remain fixed, the ratio may be altered by changing or substituting different diameters of sleeves until the proper ratio is determined that will return the piston 324 to its low position in time to receive the next pulsation of the pump 1.

Each pulsation should drive piston 324 (and consequently piston 325) against the elastic and compressible steam and thus cushion the blow in a similar manner to that of an air chamber. Drainage or relief means 332 and 333 above the valves 325 and 324 may be provided, as shown.

When steam is supplied through pipe 330 and valve 330', said steam will be under increasing compression during the rising of piston 325. With the addition of bypass 331 and check valve 331' an opening of valve 330' allows a momentary return of steam towards the boiler and said bypass may be used to further modify the travel of piston 335.

Frequent inspection is necessary to determine whether enough air remains in an air chamber such as 25′ Fig. 1, to withstand and absorb the water hammer of each pump pulsation. Whenever the existing type of air chamber fails it becomes necessary to shut down the feed pump, drain the pipe line to the boiler check valve, and then admit air to said chamber before starting up the pump again. All this will be avoided whenever my "mechanical" chamber is used in place of the other type. This surge chamber may be also employed in the secondary spray head system in place of chamber 17.

As a final means of automatic pump speed regulation I have shown (on Fig. 1) a governor 340, in the live steam line 26 to the pump, and pressure pipe 341 from the heater vessel that may be adjusted so that a falling off of pressure in the steam heating supply to below that of a predetermined minimum, is immediately followed by a reduction of the live steam supply to the pump and a consequent slowing of pump speed.

This may be adapted to two or more successively slower stages of speed, whenever the pressure lessens within the heater vessel. Racing or hammering of the high pressure hot water pump, due to its high speed when sufficient water is not passing through the hot water suction valves, is thereby avoided.

The general operation of this invention and its allied attachments are as follows;

Cold supply water from the locomotive tender enters the pump suction and is sprayed into the steam space of the heater vessel receiving heating steam from the locomotive exhaust. The spray head within the vessel is adapted to several different resistances to this incoming water. The heated water and resulting condensate fall to the bottom of the vessel and are withdrawn by the hot water feed pump and forced to the locomotive boiler.

Both the cold and hot water pumps are double acting, i. e.: each makes a delivery from alternate ends to a single discharge conduit and so supplies a nearly constant flow to the boiler. The momentary pause during reversal of each stroke is modified by the use of an air chamber, in a well known manner.

To cushion the pumping pistons at the end of each stroke and so prevent possible violent impact against the cylinder heads, I have provided a means of decreasing the water discharge openings as each piston nears the end of its travel.

The normal water level within the vessel as determined by the steam space above it and the required hydraulic head for the hot suction water valves, is maintained as follows. Adopting the same number of strokes for each pump, a definite ratio is established between the volume of incoming cold water and the removed hot water from the heater.

The steam condensate though, may vary from the zero, when no steam enters, to fifteen or more percent of same when at maximum condensation.

Should the pump volume ratios be such as to maintain a constant water level at zero condensation, then a water level float controlled means is employed to prevent injection water (to an amount equal to the condensate) from permanently entering the vessel, such being by-passed from end to end of the cold pump cylinder whenever the float rises and allows the bypass to work.

Another device is shown, wherein a hot water deficit bypass, on the lowering of the water level float, permits a flow between opposite ends of the hot water pump cylinder, thereby preventing a permanent removal of this water from said heater vessel. This is illustrated in the regulations and adjustments of the float controlled bypass valves shown within the vessel.

A secondary water spray is shown that comes into action whenever a temporary stopping of the cold supply pump ceases to feed the primary spray head, and thus maintains a continual condensation within the vessel.

A means for immediately and automatically slowing down the feed pump speed when the interior pressure of the heater vessel or its source of steam supply falls off, is set up in the pump's discharge conduit by which increased frictional resistance within, puts an extra load on the pump discharge with a consequent slacking of speed, whenever said interior heater pressure drops below a predetermined point.

The cold water supply pump has a steam cylinder that is smaller than that of the hot water feed pump and is preferably made as small as is consistent with the speed required to normally keep it in advance of the latter. This will be determined by the usual pump friction to be encountered, plus a determinable resistance that may be encountered within the spray head. On reaching the end of each stroke the cold pump gradually comes to a stop, and is not reversed until its companion pump is ready to change its own stroke.

A steam operated main steam valve, reversed by the latter pump's action, supplies live steam to both steam cylinders, and both reverse their strokes at the same time. The pump exhaust passes to the atmosphere or to within the heater vessel, as required by the heater vessel pressure conditions.

Venting of excess steam to without the vessel in varying amounts, is accomplished thru a regulating valve that will also pass out a maximum of the air that should be removed from said vessel. The comparatively large amount of steam that should be allowed to escape is mostly condensed in an externally placed condenser, air cooled and located on the top or upper side of the locomotive boiler, well above the heater vessel. The resulting condensation returns to said vessel, while a regulated amount of the remaining steam and included air finally reaches the atmosphere and is dispersed.

Means to compel the steam to follow its prescribed course and not to flow out thru the condensate connection, out from the condenser are herein shown.

To retain the benefits of the usual air chamber as installed on most pumps but also to assure the greater reliability of not being subjected to the loss of the necessary air contained therein and its undesirable transfer to the locomotive boiler, a mechanical substitute for the same has been employed that is much preferable.

This uses the pressure of live steam as an elastic force when in conjunction with high duty pumping.

A means employed for low duty pumping allows a small quantity of water from time to time, to force back a valve, that is returned to its first position at the end of each pump pulsation, such as by means of an adjustable spring.

It will be seen from the preceding pages that I have invented an extremely compact and efficient feedwater heater and pump outfit, its vertical dimension being kept at a minimum while its other dimensions permit its installation on one of several places on a modern locomotive. Automatic devices are also shown that relieve the enginemen from having to pay much attention towards its operation.

Auxiliary steam heating supply and pump speed control, obviate the accidental pumping of cold water to the boiler while the air condensation of excess exhaust steam adds to the general economy. Adjustable throttling of the cold spray to the vessel allows a ready control of the cold pump's speed within narrow limits and simplifies the control of the main steam valve of the pump.

For instance to adjust and operate the pumps shown in Figs. 1, 2, etc. when they have the same unit live steam pressure within both high and low duty steam cylinders, a small diameter steam piston is employed to reduce the total thrust developed in the low duty supply pump 3, keeping its piston speed substantially down to that of its companion high duty pump.

To finally adjust its speed to the proper limits, adjustable resistance can be set up in the supply pump's discharge line, such as the perforated rotating hollow cylinder 253 within the spray head (shown in Fig. 39).

With the maximum piston speed of the high duty pump 1 established, adjustments to 253 may be made that will normally keep the low duty piston speed slightly in excess of the other pump. Proper cushioning of the smaller pump at the end of each stroke will slowly bring it to a standstill and so be ready to reverse its travel when the high duty piston ends its stroke and shifts the main steam valve 27.

Automatic slowing down of the high duty pump whenever there is not enough pressure within the heater vessel to force the proper amount of water through the suction valves and so maintain contact with the pumping piston at all times, insures additional safety of operation.

The steam end of the piston in the pump line resistance may be made large enough to cause a flow of water towards the boiler check valve during the pump's reversal of stroke, thereby preventing the seating of the valve and its consequent pounding. Again by preventing the ready escape of steam from above this piston, an excess pressure could be built up, that would accomplish similar results.

The air cooler condenser for excess escaping steam vented out of the heater vessel, is not restricted as to capacity. A small size apparatus located at any convenient place on the upper part of the locomotive boiler will condense an amount of steam determined by the exposed area of the steam units and their contact with the cooling air. The employment of a large unit would handle more excess steam, all this to be determined by existing conditions.

While the various improvements of this invention have been shown as parts of a general design for an open type of feedwater heater, some may be readily applied to a closed or pressure type of heater also.

For example, this would include the automatic resistance within the pump discharge, an improved auxiliary steam supply valve, an interior steam jacket for the pump, an external air cooled steam condenser and means for handling the condensate therefrom, and also a mechanical surge chamber placed in the pump lines.

The term "excess cold water" is herein applied to that water or its equivalent that if permanently forced into the heater vessel, would tend to cause a rising of the water level within.

The term "deficit hot water" is herein applied to that water or its equivalent, that if permanently withdrawn from the heater vessel, would be likely to cause a drop of the water level within.

A double acting pump is herein regarded as a double discharge pump, in which a discharge occurs at each stroke of the pump, and into a common discharge conduit.

The term "low duty pump" may properly be applied to the cold water pump which draws cold water from the supply tank and forces it into the heater vessel at a relatively low pressure and the term "high duty pump" may be applied to the hot water pump which draws hot water from the heater vessel and forces it into the boiler or other consumption means at a materially greater pressure.

I claim:

1. In an open type feedwater heater, a steam heated vessel, cold water supply means and hot water removal means, an excess cold water return means, a deficit hot water return means, and common water level control means for influencing the excess return means and the deficit return means.

2. In a boiler feed system, including a heater vessel supplied with heating steam, a boiler feed pump, a conduit connecting the pump with the heater vessel and means for introducing resistances into the pump discharge conduit and causing a greater projected surface to be opposed to the passage of delivery water whenever the vessel's internal pressure diminishes below a predetermined point and vice-versa.

3. In an open type feedwater heater, a steam heated vessel, a primary spray head, a second spray head, a water storage chamber connected to the secondary sprayhead, and means to cause water to flow from said storage chamber to said secondary spray head when the primary spray head substantially ceases functioning.

4. In a feedwater heater with a steam heated vessel, a primary spray head and a secondary spray head, a water storage container, a pump supply means to the primary spray head and to said container, a valve device opening into said container under pump pressure but closing when said pressure substantially ceases, means causing water in said container to flow to and thru said secondary spray head.

5. In a feedwater heater, a heating vessel, a main steam supply means for normally heating the same, auxiliary exhaust steam supply means connected both to the vessel and to the atmosphere, said vessel connections including an admission valve having adjustable means that keeps said valve open to the vessel when the pressure within the vessel is nearly atmospheric, while a greater increase in the vessel pressure tends to close said valve.

6. In a feedwater heater, a heater vessel, a conduit leading to the heater vessel, a pump line and a pump drawing heater supply water through the pump line, a surge valve chamber connected to said pump line, said chamber being connected by a water conduit to said vessel and said chamber being provided with a spring pressed relief valve that opens with a predetermined excess water pressure in said pump line permitting water to pass by said valve and to flow through the conduit leading to the heater vessel.

7. Boiler feed water supply apparatus comprising a steam heated vessel, a double acting low duty cold water supply pump with cylinder and piston for supplying cold water to the heater vessel alternately from opposite ends of the cylinder in successive strokes of the piston, a double acting high duty hot feed water pump with cylinder and piston for draining hot water from said vessel and forcing it into a boiler alternately from opposite ends of the hot water cylinder in successive strokes of the piston thereof, a steam cylinder and piston for driving each of said pump pistons independently and a reversing valve for simultaneously supplying steam to the adjacent ends of the steam pistons whereby on each stroke of each piston cold water is forced into the heater vessel and hot water is withdrawn from the heater vessel and also forced into the boiler, the two steam cylinders and their pistons being designed to apply materially different unit pressures to the cold and hot water pumps respectively.

8. In a feed water heater, a vessel heated by steam, a double acting cold water pump having a cylinder and piston for receiving cold water from a supply source and forcing it into the heater vessel, a separate double acting hot water feed pump having a cylinder and piston for drawing hot water from the vessel and forcing it into a boiler, a float in the vessel and a valve controlled by the float for at times by-passing cold water from the discharge end of the cold water cylinder to the suction end of the cold water cylinder.

9. Boiler feed water heater apparatus comprising a heater vessel, a pump with connections for forcing hot water from said vessel to a boiler and protective means interposed between the pump and the boiler for preventing shocks due to the pump action without introducing air into the system, said protective means comprising a cylinder connected at one end only to the pump discharge and connected at the other end to the boiler, piston means operable in the cylinder and a one-way check valve interposed between the cylinder and the boiler for permitting steam pressure from the boiler to be applied to the piston means and preventing escape of steam from the cylinder, so as to cushion the action of the piston means under pressure of the pump.

10. A boiler feed water supply system comprising a heater vessel, a pump with a piston with connections for supplying cold water to the heater vessel, means controlled by the variation in water level in the heater vessel for regulating the amount of cold water admitted to the heater vessel, an independent hot water pump and piston for withdrawing hot water from the heater vessel and forcing it into a boiler, and means for at times synchronizing the strokes of the pistons of the cold and hot water pumps respectively and delaying the delivery of the hot water piston until the completion of the corresponding stroke of the cold water piston.

11. Boiler feed water supply apparatus comprising a steam heated vessel, a double acting low duty cold water supply pump with cylinder and piston for supplying cold water to the heater vessel alternately from opposite ends of the cylinder in successive strokes of the piston, a double acting high duty hot feed water pump with cylinder and piston for draining hot water from said vessel and forcing it into a boiler, a steam cylinder and piston for driving each of said pump pistons independently, and means controlled by changes in water level in the heater vessel for regulating the amount of cold water forced into said vessel and the amount of hot water withdrawn from said vessel.

12. In a feed water heater, a steam heated vessel, means for spraying cold water into said vessel, a pump including a cylinder and a steam driven piston with valves for withdrawing hot water from the vessel into the cylinder on each stroke of the piston and forcing hot water into a boiler on the return stroke of the piston, and a by-pass conduit with connections for transferring deficit hot water from one end of the cylinder to the other end of the same cylinder when the hot water level in the heater vessel tends to fall below a predetermined level so as to maintain a safe level of water in the heater vessel without passing the hot water into the cold water supply.

13. In an open type feed water heater, a vessel heated by exhaust steam, a double acting pump including a cylinder and piston for supplying relatively cold water to said heater vessel, an independently operated double acting pump including a cylinder and piston for withdrawing hot water from said heater vessel and forcing the hot water to a means of consumption thereof, means for at times synchronizing the strokes of the two pumping pistons, means for regulating the water level in the heater vessel and means for retarding the delivery from the hot water pump until the substantial completion of the corresponding stroke of the cold water pump piston.

14. In a feed water heater, a steam heated vessel, a double acting cold water supply pump including a cylinder and reciprocating piston for pumping cold water into said heater vessel, a steam driven piston for operating the piston of the cold water pump, a hot water feed pump including a cylinder and reciprocating piston for withdrawing hot water from the vessel and discharging it to a means of consumption, a steam driven piston for operating the piston of the hot water pump, said hot water pump operating against a materially higher pressure than the pressure in said vessel and the pistons of the hot and cold water pumps being operable independently of each other throughout the major parts of their strokes, and means for at times synchronizing the strokes of the hot and cold water pumping pistons.

15. A boiler feed water supply system comprising a heater vessel, a pump with a piston with connections for supplying cold water to the heater vessel, means controlled by the variation in water level in the heater vessel for regulating the amount of cold water admitted to the heater vessel, an independent hot water pump and piston for withdrawing hot water from the heater vessel and forcing it into a boiler, and common means for at times synchronizing the strokes of the pistons of the cold and hot water pumps respectively and for preventing the hot water pumping piston completing its stroke before the completion of the cold water pumping piston stroke.

16. A construction as set forth in claim 14 in which the synchronizing means includes a common main steam valve for controlling the amount of steam for said cylinders together with means for simultaneously admitting steam to each cylinder at the commencement of each pumping stroke.

EDMUND H. BLUNT.